June 17, 1958  W. SCHULLER  2,838,879
APPARATUS FOR DRAWING GLASS FILAMENTS
Filed May 12, 1955
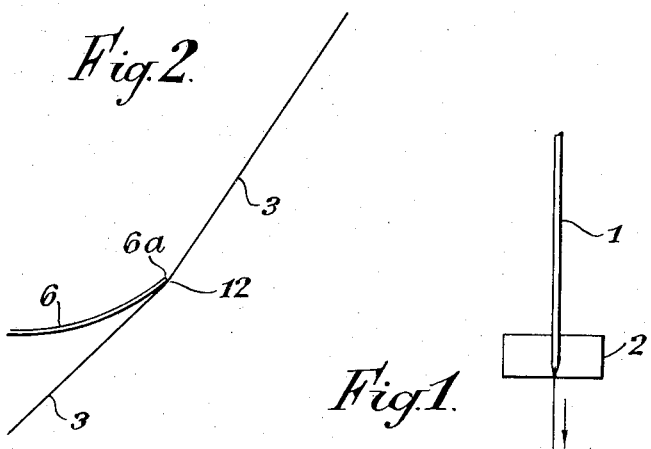
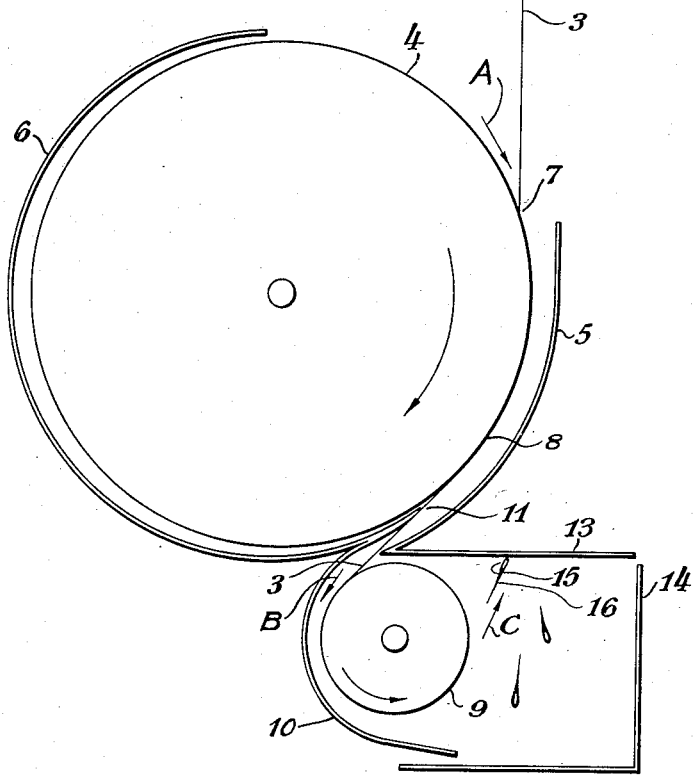
INVENTOR
Werner Schuller
BY Morgan, Finnegan, Durham & Pine
ATTORNEYS United States Patent Office 2,838,879
Patented June 17, 1958

2,838,879

APPARATUS FOR DRAWING GLASS FILAMENTS

Werner Schuller, Alsager, England

Application May 12, 1955, Serial No. 507,924

Public Law 619, August 23, 1954
Patent expires May 6, 1969

3 Claims. (Cl. 49—17)

The present invention relates to a novel apparatus for manufacturing threads of glass or the like.

It apparatus for manufacturing threads from glass or other material rendered plastic by heat and having like physical characteristics, fine threads are drawn, either from individual glass rods, or from molten glass material by means of a drawing drum. Fine filaments for example, of $9\mu$ and less, are however very often liable to break. In such cases it is common practice for a drop of glass to be originated at the break, and this drop descends slowly drawing a new filament with it. In order to apply the filament upon the drawing drum, guide plates are commonly used to guide the drop towards the drawing drum, and for contacting the filament with the drum on which it is then drawn. The wind created by the rotation of the drum accelerates the movement of the drop, and exerts a tractive force upon the subsequent filament. But the wind thus caused has the obnoxious effect, before and immediately after the drop is in contact with the drum, of urging the new filament to leave the drawing drum. If this occurs only a sliding of the drawing drum along the new filament takes place, and long lengths of filaments are drawn off and wasted, before the drawing drum picks up the filament properly and winds it up.

Manufacturing filaments of glass in this way also has the following disadvantages:

(1) Drops, splinters of glass, and the enlarged parts of the filament adjoining the drop, called spikes, are drawn upon the drawing drum at the time when the filament begins to adhere to the drum. These objects are thus mixed with the fine filaments on the drum and being of different quality they are harmful to the further process of making a good quality sliver.

(2) With such apparatus it is evident that the heating unit that is used for melting the ends of the glass rods, or for keeping the glass in the small furnace in liquid condition, should not be heated too much. The reason is that under such conditions the filament is more liable to break, and generally speaking high temperatures are not desirable in this respect. Higher temperatures were up to the present necessary, for the reason that the drop and its filament had to descend with a certain velocity in order that it should be sufficiently thin to be picked up by the drawing drum. When the drop descended slowly, it was found that there was no immediate take-up of the filament by the drawing drum, and long lengths of thick, unspinnable filament were wasted.

These disadvantages are removed by the apparatus according to the invention by exerting an additional pull, for example, a mechanical pull, upon the new filaments.

The accompanying drawings, referred to herein and constituting a part hereof, illustrate one embodiment of the invention, and, together with the description, serve to explain the principles of the invention.

Figure 1 is a diagrammatic side elevation of apparatus for manufacturing glass threads including a drawing drum, and Figure 2 is a side elevation of a part of the apparatus.

In the drawing 1 represents a row of glass rods, 2 a heating device for melting the ends of the rods, 3 a new filament that is formed by the descent of a drop of glass at the position of the break of a previous filament; 4 is a drawing drum, 5 a guide plate. 6 is a metal apron or cover surrounding the drawing drum for a part only of its periphery. The wind caused by the rotation of the drum acts upon the filament 3 in the direction of the arrow A, and at first tends to urge it away from the peripheral surface of the drawing drum, but exerts a certain amount of pull on the drop and later on the new filament, as for example, near the position 8. Such a pull is exerted too by the friction between the filament and the drawing drum before the filament is finally picked up.

According to the invention, in addition to the normal forces referred to acting on the new filament 3 another and additional pull is exerted, such for example, as a mechanical pull upon the filament.

In the preferred embodiment a second drawing drum 9 smaller than the main drawing drum 4 is used for this purpose, and the descending drop with its filament is guided towards it by a guide plate 10. Owing to the smaller diameter and its special position, the new filament is picked up immediately and a pull is exerted upon it in the direction of the arrow B. The filament is finally picked up by the drawing drum 4, first referred to, and wound up. When doing so the filament will break approximately near the position 11, for example, at the beginning 6a (Figure 2) of the apron 6, and the thick part of the filament adjoining the drop has no chance to be wound up on the main drum; in this way thick parts of filaments and splinters cannot spoil the evenness and good quality of the sliver.

It is not necessary that the peripheral velocity of the smaller drum 9 be as great as that of the main drawing drum 4, but in any case it must be greater than the velocity of the descending drop.

In order to secure the break-off of the new filament and to avoid the thicker part of the filament being caught by the main drawing drum 4, the position of the small drum 9 is such as to form a nick 12 for example at the beginning 6a of the apron 6. The nick is shown on an enlarged scale in Figure 2.

The small drawing drum 9 is covered by a baffle plate 13 which intercepts the drops and enlarged parts of the threads as carried by the additional drum 9 over part of its periphery. A container 14 is provided below the baffle plate 13 to collect the drops and spikes. The drops 15 with the adhering thick parts 16 of the filaments are thrown against the covering sheet of metal by the drawing drum in, or substantially in, the direction of the arrow C, and are collected in the container space 14.

It will be evident that the advantages of the invention will accrue in the same manner with apparatus, in which the glass filaments or the like are drawn straight from molten glass using nozzles in a small furnace.

By the apparatus according to the invention, the following advantage is obtained:

Thick parts of the filament and splinters of the drop are completely removed from contact with the main drawing drum and in this way have no chance to contaminate the sliver which is taken off from the main drawing drum. Picking up of broken filament is infrequent, and when it occurs, is effected with the least possible waste.

The invention in its broader aspects is not limited to the specific combinations and improvements described, but departures may be made therefrom within the scope of the accompanying claims without departing from the principles of the invention and without sacrificing its chief advantages.

I claim:

1. Apparatus for the manufacture of glass threads, comprising a main drawing drum for initially picking up filaments drawn from molten glass material at a point on its periphery, an auxiliary drawing drum disposed underneath the main drawing drum and positioned to pick up the filament at a point on its periphery, and a device for breaking the filament between the points of pick up on the main and auxiliary drawing drums.

2. Apparatus as defined in claim 1, wherein there is provided an apron surrounding the main drawing drum, the forward edge of said apron being positioned so as to create a nick in a new thread formed on the breaking of a thread, said nick being provided in the new thread between the picking up position at the drawing drum and the picking up position at the auxiliary drum, thus facilitating breaking of the new thread.

3. Apparatus as defined in claim 1, including a baffle plate positioned above the auxiliary drawing drum for intercepting thread drops and enlarged parts of the threads carried along by the auxiliary drawing drum over parts of its periphery and a collecting container for collecting said drops and enlarged parts of the threads passed over said auxiliary drum.

References Cited in the file of this patent

UNITED STATES PATENTS

| 1,427,014 | Von Pazsiczky | Aug. 22, 1922 |
| 2,255,426 | Lamesch | Sept. 9, 1941 |

FOREIGN PATENTS

| 670,513 | Great Britain | Apr. 23, 1952 |